United States Patent
Chen et al.

(10) Patent No.: US 12,359,560 B1
(45) Date of Patent: Jul. 15, 2025

(54) METHOD FOR EVALUATING TEMPORARY PLUGGING EFFECT OF FRACTURING IN LOW-PERMEABILITY OIL-GAS RESERVOIR BASED ON MONITORING PRESSURE

(71) Applicant: SOUTHWEST PETROLEUM UNIVERSITY, Sichuan (CN)

(72) Inventors: Xiyu Chen, Chengdu (CN); Haiyang Tang, Chengdu (CN); Yongming Li, Chengdu (CN); Jinzhou Zhao, Chengdu (CN); Xia Dan, Chengdu (CN); Linyao Yu, Chengdu (CN)

(73) Assignee: SOUTHWEST PETROLEUM UNIVERSITY, Chengdu (CN)

( * ) Notice: Subject to any disclaimer, the term of this patent is extended or adjusted under 35 U.S.C. 154(b) by 0 days.

(21) Appl. No.: 19/047,689

(22) Filed: Feb. 7, 2025

(30) Foreign Application Priority Data

Jul. 24, 2024 (CN) .......................... 202410993549.9

(51) Int. Cl.
*E21B 47/117* (2012.01)
*G01V 99/00* (2024.01)

(52) U.S. Cl.
CPC ............ *E21B 47/117* (2020.05); *G01V 99/00* (2013.01)

(58) Field of Classification Search
None
See application file for complete search history.

(56) References Cited

U.S. PATENT DOCUMENTS

| 2015/0083423 A1* | 3/2015 | Brannon | C09K 8/62 166/292 |
| 2016/0333680 A1* | 11/2016 | Richter | C09K 8/62 |
| 2024/0200432 A1 | 6/2024 | Chen et al. | |

FOREIGN PATENT DOCUMENTS

| CN | 110905472 A | 3/2020 |
| CN | 114509314 A * | 5/2022 |
| GB | 202209351 | 8/2022 |

OTHER PUBLICATIONS

CN114509314A translation (Year: 2022).*
Decision to Grant a Patent in Chinese Application No. 202410993549.9 mailed on Sep. 2, 2024, 7 pages.
(Continued)

*Primary Examiner* — Lina Cordero
(74) *Attorney, Agent, or Firm* — Porus IP LLC

(57) ABSTRACT

The present disclosure relates to a method for evaluating a temporary plugging effect of fracturing in a low-permeability oil-gas reservoir based on monitoring pressure. The method comprises: calculating a wellbore friction resistance along a way from a wellhead to a target fracturing segment; calculating, based on a wellhead pressure monitored at the wellhead in real time, a wellbore pressure at the target fracturing segment; calculating a fluid pressure at a crack opening of each perforation cluster; calculating a perforation friction resistance coefficient of each perforation cluster; calculating a fracturing fluid instantaneous displacement of each perforation cluster; calculating, based on the fracturing fluid instantaneous displacement of each perforation cluster, a variation coefficient of a fracturing fluid displacement distribution after a fracturing construction is completed; and evaluating the temporary plugging effect of fracturing based on the variation coefficient.

9 Claims, 4 Drawing Sheets

(56) References Cited

OTHER PUBLICATIONS

Su, Liangyin et al., Study on repeated stimulation technology and its application to in low-yield horizontal wells in ultra low permeability oil reservoirs, Changqing Oilfield, Oil Drilling & Production Technology, 39(4): 521-527, 2017.

Li, Yanchao et al., Multi-Fracture Growth Law for Temporary Plugging and Diversion Fracturing of Horizontal Well with Multiple Clusters in Shale Reservoir, Processes, 11(8): 1-13, 2023.

* cited by examiner

METHOD FOR EVALUATING TEMPORARY PLUGGING EFFECT OF FRACTURING IN LOW-PERMEABILITY OIL-GAS RESERVOIR BASED ON MONITORING PRESSURE

CROSS-REFERENCE TO RELATED APPLICATIONS

This application claims priority to Chinese Patent No. 202410993549.9, filed on Jul. 24, 2024, entitled "Method for evaluating a temporary plugging effect of fracturing in a low-permeability oil-gas reservoir based on monitoring pressure", the entire contents of which are incorporated herein by reference.

TECHNICAL FIELD

The present disclosure relates to the technical field of hydraulic fracturing, and in particular to a method for evaluating a temporary plugging effect of fracturing in a low-permeability oil-gas reservoir based on monitoring pressure.

BACKGROUND

For an unconventional low-permeability oil-gas reservoir, the hydraulic fracturing technology is a key technology for transforming the reservoir, improving permeability, and achieving industrial production capacity. Most unconventional low-permeability oil-gas wells use the horizontal well segmented fracturing technology. The segmented fracturing technology uses a certain amount of perforation clusters in each fracturing segment for simultaneous fracturing multiple perforation clusters to improve the efficiency of crack construction. Due to reservoir heterogeneity and inter-crack stress interference, some perforation clusters form dominant cracks during the fracturing process, resulting in insufficient fluid supply to other perforation clusters, and poor development of the final hydraulic cracks. During the segmented fracturing process, the uneven expansion of a plurality of cracks in the segment reduces the overall effect of reservoir transformation, which affects the subsequent production capacity.

To address the problem of uneven expansion of the cracks of segmented fracturing, degradable temporary plugging balls can be placed into the well during fracturing through the temporary plugging and diversion technology to temporarily plug the dominant cracks, thereby forcing the fracturing fluid to enter other cracks, and improving the uniformity of the development of the cracks. So far, most temporary plugging and diversion designs are implemented based on field experience of engineers and have high limitations.

Therefore, it is desirable to provide a method for evaluating a temporary plugging effect of fracturing in a low-permeability oil-gas reservoir based on monitoring pressure, so as to more accurately design and evaluate parameters of temporary plugging and diversion.

SUMMARY

One of the embodiments of the present disclosure provides a method for evaluating a temporary plugging effect of fracturing in a low-permeability oil-gas reservoir based on monitoring pressure. The method may comprise: S1, collecting engineering data and geological data of a target oil-gas well; S2, determining, based on a count of perforation clusters in a target fracturing segment, a fracturing fluid displacement of each perforation cluster; S3, calculating a wellbore friction resistance along a way from a wellhead to the target fracturing segment; S4, calculating, based on a wellhead pressure monitored at the wellhead in real time, a wellbore pressure at the target fracturing segment; S5, calculating, based on the fracturing fluid displacement of each perforation cluster, a fluid pressure at a crack opening of each perforation cluster; S6, determining whether to carry out a temporary plugging operation based on a temporary plugging operation time and a cumulative fracturing time, and determining a count of effective perforation clusters of the perforation clusters; in response to determining that the cumulative fracturing time is less than the temporary plugging operation time, determining that the count of effective perforation clusters of the perforation clusters is equal to the count of perforation clusters; S7, calculating, based on the count of effective perforation clusters of the perforation clusters, a perforation friction resistance coefficient of each of the perforation clusters; S8, establishing a pressure balance equation, and solving a fracturing fluid instantaneous displacement of each of the perforation clusters using an arbitrary optimization algorithm; S9, determining whether a fracturing construction is completed based on a total hydraulic fracturing time and the cumulative fracturing time, in response to determining that the fracturing construction is not completed, updating the fracturing fluid displacement of each of the perforation clusters and the cumulative fracturing time, and repeating the operations S3-S9 until the fracturing construction is completed, and proceeding to operation S10; S10, calculating, based on the fracturing fluid instantaneous displacement of each of the perforation clusters, a variation coefficient of a fracturing fluid displacement distribution after the fracturing construction is completed; and S11, evaluating a temporary plugging effect of fracturing according to the variation coefficient of the fracturing fluid displacement distribution.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering indicates the same structure, wherein.

DETAILED DESCRIPTION

Figure 1:
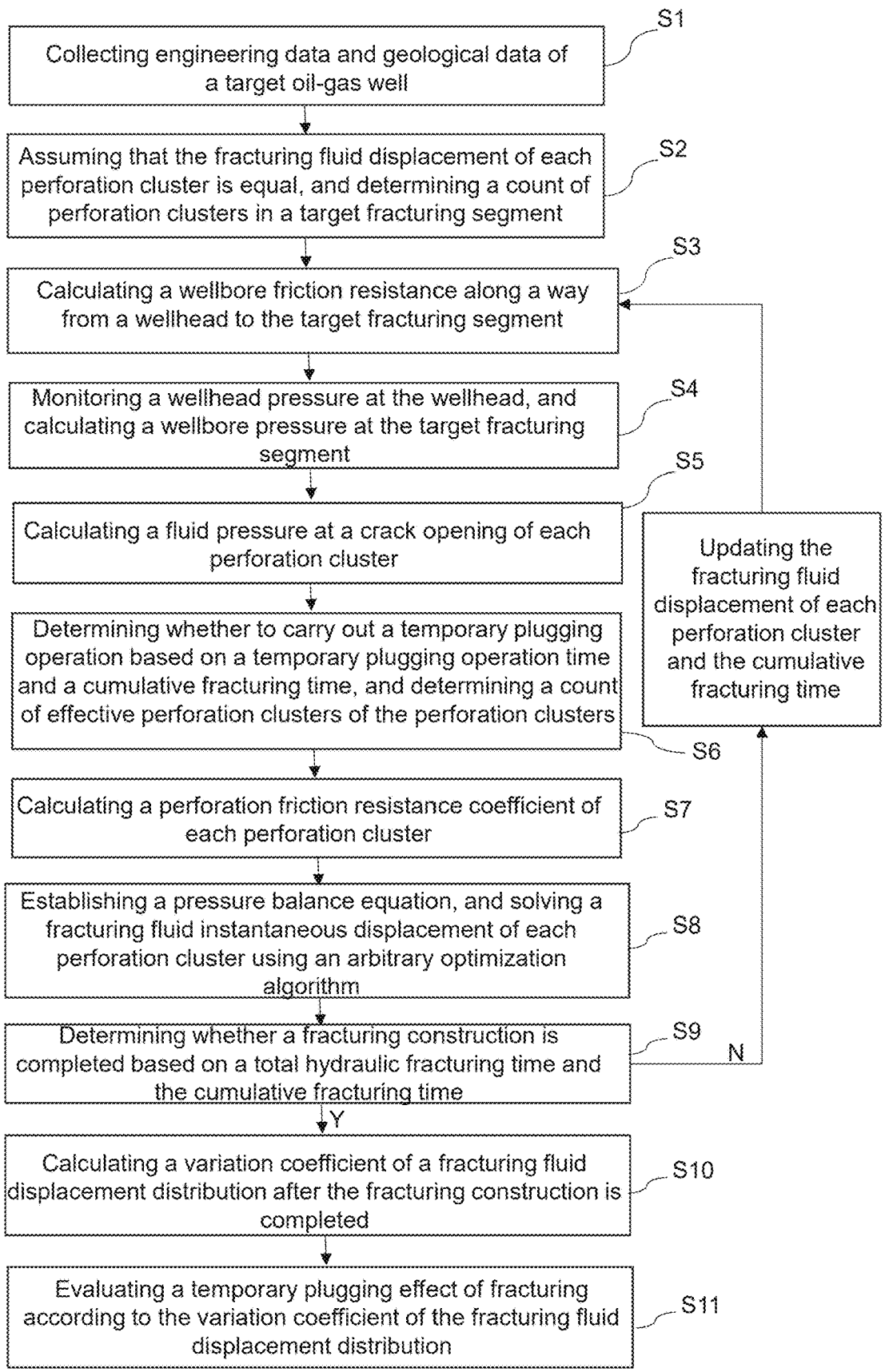
FIG. 1 is a flowchart illustrating an exemplary method for evaluating a temporary plugging effect of fracturing in a low-permeability oil-gas reservoir based on monitoring pressure according to some embodiments of the present disclosure.

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

It should be understood that the terms "system," "device," "unit" and/or "module" used herein are a way to distinguish between different components, elements, parts, sections, or assemblies at different levels. However, the terms may be replaced by other expressions if other words accomplish the same purpose.

As shown in the present disclosure and in the claims, unless the context clearly suggests an exception, the words "one," "a," "an," "one kind," and/or "the" do not refer specifically to the singular, but may also include the plural. Generally, the terms "including" and "comprising" suggest only the inclusion of clearly identified steps and elements, however, the steps and elements that do not constitute an exclusive list, and the method or apparatus may also include other steps or elements.

Flowcharts are used in the present disclosure to illustrate the operations performed by a system according to embodiments of the present disclosure, and the related descriptions are provided to aid in a better understanding of the magnetic resonance imaging method and/or system. It should be appreciated that the preceding or following operations are not necessarily performed in an exact sequence. Instead, steps can be processed in reverse order or simultaneously. Also, it is possible to add other operations to these processes or to remove a step or steps from these processes.

Figure 2:
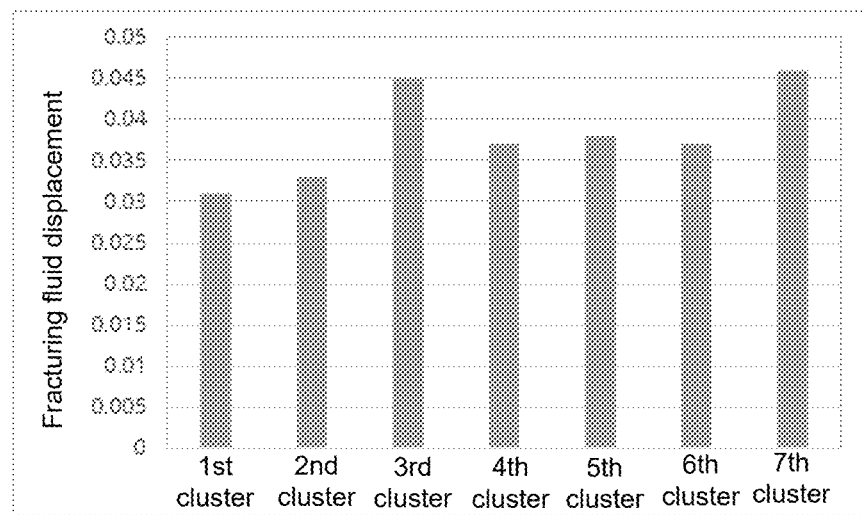
FIG. 2 is a histogram illustrating a fracturing fluid displacement of each perforation cluster according to some embodiments of the present disclosure.

FIG. 1 is a flowchart illustrating an exemplary method for evaluating a temporary plugging effect of fracturing in a low-permeability oil-gas reservoir based on monitoring pressure according to some embodiments of the present disclosure. FIG. 2 is a histogram illustrating a fracturing fluid displacement of each perforation cluster according to some embodiments of the present disclosure. The method for evaluating the temporary plugging effect of fracturing in the low-permeability oil-gas reservoir provided in some embodiments of the present disclosure can be implemented by a system 300 for temporary plugging control of fracturing in a low-permeability oil-gas reservoir. More descriptions regarding the system 300 for temporary plugging control may be found in FIG. 3 and the related descriptions thereof.

As shown in FIG. 1, the method may include the following operations:

In S1, engineering data and geological data of a target oil-gas well may be collected.

The target oil-gas well refers to an oil-gas well that needs fracturing construction. The fracturing construction may include at least a hydraulic fracturing operation and a temporary plugging operation. The hydraulic fracturing operation is a process of forming cracks in the geosphere and filling a proppant by injecting a fracturing fluid at a high pressure. The temporary plugging operation is a process of temporarily plugging the cracks by injecting a temporary plugging material before or during the hydraulic fracturing operation to adjust a flow direction of the fracturing fluid.

The engineering data may include a wellbore length L from a wellhead to a target fracturing segment of the target oil-gas well, a wellbore hydrostatic fluid column pressure $p_g$ from the wellhead to the target fracturing segment, an inner diameter D of a wellbore, a fracturing fluid flow rate (also referred to as "a flow rate of the fracturing fluid") $v_p$ in the wellbore, an internal roughness $\varepsilon$ of the wellbore, a count n of perforation clusters, a perforation aperture (also referred to as "an aperture of a perforation") d, a pumping sand ratio $\varepsilon_p$, a total fracturing fluid displacement Q, a fracturing fluid viscosity (also referred to as "a viscosity of the fracturing fluid") $\mu$, a fracturing fluid density (also referred to as "a density of the fracturing fluid") $\rho$, a temporary plugging operation time T, a count R of temporary plugging balls, and a total hydraulic fracturing time $T_a$. The geological data may include a Young's modulus E of reservoir rock, a Poisson's ratio $\nu$ of the reservoir rock, and a thickness H of an oil-gas layer.

Perforations are holes used to inject a fracturing fluid (also referred to as "sand-carrying fracturing fluid") into the geosphere during hydraulic fracturing. A plurality of perforations may constitute a perforation cluster. As the fracturing fluid is injected, the pressure applied to the geosphere continues to increase. When the pressure exceeds the tolerance of the geosphere, cracks appear on a bottom surface starting from the perforations.

The target fracturing segment refers to a region of the oil-gas well where fracturing construction is required.

The total fracturing fluid displacement refers to a total volume of the fracturing fluid discharged from all perforations in the perforation cluster per unit time.

The temporary plugging operation time refers to a time point when the temporary plugging operation starts. In some embodiments, the temporary plugging operation time may be represented by a duration from the start of the fracturing construction. For example, if the temporary plugging operation starts 3400 s after the fracturing construction begins, the temporary plugging operation time may be marked as 3400 s.

The total hydraulic fracturing time refers to a total duration of the fracturing construction.

In some embodiments, the target fracturing segment, the wellbore length, the inner diameter of the wellbore, the count of perforation clusters, the perforation aperture, the pumping sand ratio, the fracturing fluid viscosity, the fracturing fluid density, the temporary plugging operation time, and the count of temporary plugging balls may be predetermined based on an actual construction plan. The wellbore hydrostatic fluid column pressure, the fracturing fluid flow rate in the wellbore, the internal roughness of the wellbore, the total fracturing fluid displacement, the fracturing fluid viscosity, the fracturing fluid density, the temporary plugging operation time, and the total hydraulic fracturing time may be obtained through an engineering monitoring device disposed in the target oil-gas well. The Young's modulus of the reservoir rock, the Poisson's ratio of the reservoir rock, and the thickness of the oil-gas layer may be obtained based on a geological detection device disposed at the position of the target oil-gas well. More descriptions regarding the engineering monitoring device and the geological detection device may be found in the related descriptions of FIG. 3 in the present disclosure.

In some embodiments, a remote processor 370 may set a cumulative fracturing time as t and set a time step size of a simulation calculation time as Δt. The time step size may be set based on prior experience. More descriptions regarding the remote processor 370 may be found in the related descriptions of FIG. 3 in the present disclosure.

The cumulative fracturing time may be represented by a duration from the start of the fracturing construction. For example, if the pressure construction is carried out for 500 s, the cumulative fracturing time may be recorded as 500 s.

In S2, assuming that the fracturing fluid displacement of each perforation cluster is equal, a fracturing fluid displacement of each perforation cluster may be determined based on a count of perforation clusters N in a target fracturing segment.

In some embodiments, the remote processor 370 may determine the fracturing fluid displacement of each perforation cluster based on the following formula (1).

$$q_i = \frac{Q}{N}, i = 1, 2, 3 \ldots, N, \quad (1)$$

where $q_i$ denotes the fracturing fluid displacement of an i-th perforation cluster, measured in m³/s; Q denotes a total fracturing fluid displacement, measured in m³/s; and N denotes the count of perforation clusters in the target fracturing segment.

The fracturing fluid displacement refers to a volume of fracturing fluid discharged from a single perforation per unit time.

In S3, a wellbore friction resistance $p_f$ along a way from a wellhead to the target fracturing segment after a cumulative fracturing time t may be calculated.

In some embodiments, the remote processor 370 may determine the wellbore friction resistance along the way from the wellhead to the target fracturing segment (also referred to as "wellbore friction resistance") based on the following formula (2).

$$p_f = L \cdot s \cdot \frac{\rho\, v_p^2}{2\, D}, \quad (2)$$

where $p_f$ denotes the wellbore friction resistance along the way from the wellhead to the target fracturing segment, measured in Pa; L denotes a wellbore length from the wellhead to the target fracturing segment, measured in m; s denotes a wellbore friction coefficient; ρ denotes a fracturing fluid density, measured in kg/m³; $v_p$ denotes a fracturing fluid flow rate in the wellbore, measured in m/s; and D denotes an inner diameter of the wellbore, measured in m.

In some embodiments, the remote processor 370 may calculate the wellbore friction coefficient s based on the following formula (3):

$$\frac{1}{s} = \left(\frac{Re}{64}\right)^a \left(1.8 \log \frac{Re}{6.8}\right)^{2(1-a)b} \left(2.0 \log \frac{3.7D}{\varepsilon}\right)^{2(1-a)(1-b)}. \quad (3)$$

In some embodiments, the remote processor 370 may calculate coefficients a and b based on the following formulas (4) and (5), respectively.

$$a = \frac{1}{1 + \left(\frac{Re}{2720}\right)^9}, \quad (4)$$

$$b = \frac{1}{1 + \left(\frac{Re}{160\frac{D}{\varepsilon}}\right)^2}, \quad (5)$$

where ε denotes an internal roughness of the wellbore, measured in m.

Re denotes a Reynolds number of sand-carrying fracturing fluid flow, which is used to describe flow characteristics of the sand-carrying fracturing fluid. In some embodiments, the remote processor 370 may determine the Reynolds number of the sand-carrying fracturing fluid flow based on the following formulas (6) and (7).

$$Re = \frac{\rho v D}{\mu_m}, \quad (6)$$

$$\mu_m = \mu\left(1 - \frac{\varepsilon_p}{0.6}\right)^{-2}, \quad (7)$$

where Re denotes the Reynolds number of the sand-carrying fracturing fluid flow; $\mu_m$ denotes a viscosity of the sand-carrying fracturing fluid, measured in Pa·s; μ denotes a fracturing fluid density, measured in Pa·s; $\varepsilon_p$ denotes a pumping sand ratio; and v denotes a fracturing fluid flow rate.

In some embodiments, the fracturing fluid flow rate may be a flow rate of the sand-carrying fracturing fluid.

In S4, a wellbore pressure $p_s$ at the target fracturing segment may be calculated based on a wellhead pressure $p_0$ monitored at the wellhead by a pressure sensor after the cumulative fracturing time t.

In some embodiments, the remote processor 370 may determine the wellbore pressure at the target fracturing segment based on the following formula (8).

$$p_s = p_o - p_f + p_g, \quad (8)$$

where $p_s$ denotes the wellbore pressure at the target fracturing segment, measured in Pa; $p_0$ denotes the wellhead pressure, measured in Pa; $p_f$ denotes the wellbore friction resistance, measured in Pa; and $p_g$ denotes a wellbore hydrostatic fluid column pressure from the wellhead to the target fracturing segment, measured in Pa.

The fracturing segment referred to in some embodiments of the present disclosure refers to the target fracturing segment.

In S5, a fluid pressure at a crack opening of each perforation cluster may be calculated.

In some embodiments, the remote processor 370 may determine the fluid pressure at the crack opening of each perforation cluster based on the following formula (9).

$$p_i = 1.1\left[\frac{\mu E^4 q_i^2}{(1-v^4)H^6}\right]^{1/5} t^{1/5}, \quad (9)$$

where $p_i$ denotes a fluid pressure at a crack opening of an i-th perforation cluster, measured in Pa; μ denotes the fracturing fluid viscosity, measured in Pa·s; E denotes a Young's modulus of the reservoir rock, measured in Pa; v denotes a Poisson's ratio of the reservoir rock; $q_i$ denotes a fracturing fluid displacement of the i-th perforation cluster, measured in m³/s; H denotes a thickness of an oil-gas layer, measured in m; and t denotes the cumulative fracturing time, measured in s.

In S6, whether to carry out a temporary plugging operation may be determined based on a temporary plugging operation time T and the cumulative fracturing time t, and a count of effective perforation clusters of the perforation clusters may be calculated.

In some embodiments, in response to determining that the cumulative fracturing time t is less than the temporary plugging operation time T, it is determined that the temporary plugging operation is not carried out at the cumulative fracturing time t, and the remote processor 370 may determine that the count of effective perforation clusters of the perforation clusters is equal to the count of perforation clusters based on formula (10):

$$m_i = n, \qquad (10)$$

where $m_i$ denotes the count of effective perforation clusters of the i-th perforation cluster; and n denotes the count of perforation clusters.

In some embodiments, in response to determining that the cumulative fracturing time t is greater than or equal to the temporary plugging operation time T, it is determined that temporary plugging balls are put in to complete the temporary plugging operation before the cumulative fracturing time t, and the remote processor 370 may determine the count $m_i$ of effective perforation clusters of the i-th perforation cluster based on the following formula (11):

$$m_i = n - \left\lfloor R \frac{q_i}{Q} \right\rfloor, \qquad (11)$$

where $m_i$ denotes the count of effective perforation clusters of the i-th perforation cluster; n denotes the count of perforation clusters; R denotes a count of temporary plugging balls; $q_i$ denotes the fracturing fluid displacement of the i-th perforation cluster, measured in m³/s; and Q denotes a total fracturing fluid displacement, measured in m³/s;

where $\lfloor \ \rfloor$ denotes rounding down. In response to determining that the calculated count $m_i$ of the effective perforation clusters of the i-th perforation cluster is greater than or equal to 1, $m_i$ remains constant; in response to determining that $m_i$<1, $m_i$ is assigned to 1.

In S7, a perforation friction resistance coefficient of each of the perforation clusters may be calculated.

In some embodiments, the remote processor 370 may determine the perforation friction resistance coefficient of each of the perforation clusters based on the following formula (12).

$$f_i = \frac{12.5\rho}{\pi^2 m_i^2 d_i^4}, \qquad (12)$$

where $f_i$ denotes a perforation friction resistance coefficient of the i-th perforation cluster, measured in Pa·s²·m⁻⁶; $m_i$ denotes the count of effective perforation clusters of the i-th perforation cluster; $d_i$ denotes a perforation aperture of a perforation in the i-th perforation cluster, measured in m; and $\rho$ denotes the fracturing fluid density, measured in kg/m³.

In S8, a pressure balance equation may be established, and a fracturing fluid instantaneous displacement $r_i$ of each of the perforation clusters may be solved using an arbitrary optimization algorithm, such that a sum of each fracturing fluid instantaneous displacement $r_i$ of the perforation clusters is equal to the total fracturing fluid displacement Q, and the value F of the pressure balance equation is minimized.

In some embodiments, the remote processor 370 may determine the fracturing fluid instantaneous displacement of each of the perforation clusters based on the following formula (13).

$$F = \sum_{i=1}^{N} (p_i + f_i r_i^2 - p_s)^2, \qquad (13)$$

where F denotes a value of the pressure balance equation, measured in Pa²; $p_i$ denotes the fluid pressure at the crack opening of the i-th perforation cluster, measured in Pa; $f_i$ denotes a perforation friction resistance of the i-th perforation cluster, measured in Pa; $r_i$ denotes a fracturing fluid instantaneous displacement of the i-th perforation cluster, measured in m³/s; and $p_s$ denotes the wellbore pressure at the target fracturing segment, measured in Pa.

In S9, whether the fracturing construction is completed may be determined based on a total hydraulic fracturing time $T_a$ and the cumulative fracturing time t.

In some embodiments, in response to determining that the cumulative fracturing time t<the total hydraulic fracturing time $T_a$, it indicates that the fracturing construction is not completed. The remote processor 370 may update the fracturing fluid displacement of each of the perforation clusters and the cumulative fracturing time, and repeat the operations S3-S9 until $t \geq T_a$ is satisfied.

In some embodiments, the remote processor 370 may update the fracturing fluid displacement of each of the perforation clusters based on the following formula (14).

$$q_{i_{n+1}} = \frac{q_{i_n} t + r_{i_n} \Delta t}{t + \Delta t} \qquad (14)$$

where: $q_{i_{n+1}}$ denotes a fracturing fluid displacement of the i-th perforation cluster after updating, measured in m³/s; $q_{i_n}$ denotes a fracturing fluid displacement of the i-th perforation cluster before updating, measured in m³/s; t denotes the cumulative fracturing time, measured in s; and $\Delta t$ denotes a time step size, measured in s;

In some embodiments, the remote processor 370 may update the cumulative fracturing time based on the following formula (15).

$$t_{n+1} = t_n + \Delta t, \qquad (15)$$

where $t_{n+1}$ denotes a cumulative fracturing time after updating, measured in s; $t_n$ denotes a cumulative fracturing time before updating, measured in s; and $\Delta t$ denotes the time step size, measured in s;

In some embodiments, in response to determining that the cumulative fracturing time $t \geq$ the total hydraulic fracturing time $T_a$, it is determined that the fracturing operation is completed, and the remote processor 370 may update the fracturing fluid displacement $q_i$ of each perforation cluster to $$\frac{q_i t + r_i \Delta t}{t + \Delta t}$$

and proceed to operation S10.

In S10, a variation coefficient of a fracturing fluid displacement distribution after the fracturing construction is completed may be calculated.

In some embodiments, the remote processor 370 may calculate the variation coefficient of the fracturing fluid displacement distribution after the fracturing construction is completed based on the following formula (16).

$$V = \frac{N\sqrt{\frac{1}{N}\sum_{i=1}^{N}(q_i - Q/N)^2}}{Q}, \quad (16)$$

where V denotes the variation coefficient of the fracturing fluid displacement distribution; N denotes the count of perforation clusters in the target fracturing segment; $q_i$ denotes the fracturing fluid displacement of the i-th perforation cluster, measured in m³/s; and Q denotes the total fracturing fluid displacement, measured in m³/s.

In S11, a temporary plugging effect of fracturing may be evaluated according to the variation coefficient V of the fracturing fluid displacement distribution.

In some embodiments, in response to determining that the variation coefficient V of the fracturing fluid displacement distribution is less than or equal to 0.2, it is determined that a difference in the fracturing fluid displacement of each of the perforation clusters is small, and the remote processor 370 may determine that the temporary plugging effect of fracturing is good.

In some embodiments, in response to determining that the variation coefficient V of the fracturing fluid displacement distribution is greater than 0.2 and less than 0.4, it is determined that the difference in the fracturing fluid displacement of each of the perforation clusters is moderate, and the remote processor 370 may determine that the temporary plugging effect of fracturing is medium.

In some embodiments, in response to determining that the variation coefficient V of the fracturing fluid displacement distribution is greater than 0.4, it is determined that the difference in the fracturing fluid displacement of each of the perforation clusters is large, and the remote processor 370 may determine that the temporary plugging effect of fracturing is poor.

In some embodiments, the remote processor 370 may express the temporary plugging effect of fracturing by scoring. For example, in response to determining that a score of the temporary plugging effect of fracturing is within a range of [8, 10], it indicates that the temporary plugging effect of fracturing is relatively good. When the temporary plugging effect score of the fracturing is in the range of [5, 8), it indicates that the temporary plugging effect of the fracturing is medium. When the temporary plugging effect score of fracturing is within a range of [0,5), it indicates that the temporary plugging effect of the fracturing is poor. In some embodiments, the remote processor 370 may express the temporary plugging effect of fracturing in other ways, which can be determined based on actual needs.

In some embodiments, the score of the temporary plugging effect of fracturing may be negatively correlated with the variation coefficient of the fracturing fluid displacement distribution.

In some embodiments, the remote processor 370 may evaluate the temporary plugging effect of fracturing using an unconventional method for evaluating a temporary plugging effect of fracturing in a low-permeability oil-gas reservoir described in some embodiments of the present disclosure.

Taking the evaluation of the temporary plugging effect of the target fracturing segment of a target oil-gas well as an example, the evaluation process may include the following operations:

In S1, engineering data and geological data of a target fracturing segment in a target oil-gas well, and a histogram of a fracturing fluid displacement of each perforation cluster in the target fracturing segment may be collected. The engineering data and the geological data may be shown in Table 1, and the histogram of the fracturing fluid displacement of each perforation cluster may be shown in FIG. 2.

TABLE 1

Engineering data and geological data of target fracturing segment in target oil-gas well

| Parameter | Data | unit |
|---|---|---|
| Wellbore length L from a wellhead to the target fracturing segment | 3820 | m |
| Wellbore hydrostatic fluid column pressure $p_g$ from the wellhead to the target fracturing segment | $3.08 \times 10^7$ | Pa |
| Inner diameter D of the wellbore | 0.114 | m |
| Fracturing fluid flow rate $v_p$ in the wellbore | 26.15 | m/s |
| Internal roughness ε of the wellbore | $1.6 \times 10^{-6}$ | m |
| Count n of perforation clusters | 16 | Dimensionless |
| Pumping sand ratio $\varepsilon_p$ | 7% | Dimensionless |
| Total fracturing fluid displacement Q | 0.267 | m³/s |
| Fracturing fluid viscosity μ | $5 \times 10^{-3}$ | Pa-s |
| Fracturing fluid density ρ | 1000 | kg/m³ |
| Temporary plugging operation time T | 3400 | s |
| Count R of temporary plugging balls | 44 | Dimensionless |
| Total hydraulic fracturing time $T_a$ | 7300 | s |
| Young's modulus E of reservoir rock | $2.5 \times 10^9$ | Pa |
| Poisson's ratio v of reservoir rock | 0.22 | Dimensionless |
| Thickness H of oil-gas layer | 35 | m |

In some embodiments, an initial cumulative fracturing time may be set to t=5 s, and a time step size of the simulation calculation time may be set to Δt=5 s.

In S2, a count of perforation clusters in the target fracturing segment may be determined as N=7, and a fracturing fluid displacement $q_i$ of each perforation cluster may be calculated based on the formula (1).

In S3, a wellbore friction resistance $p_f$ along a way from a wellhead to the target fracturing segment at the cumulative fracturing time t may be calculated based on the formula (2).

In S4, a wellbore pressure $p_s$ at the target fracturing segment may be calculated based on a wellhead pressure $p_0$ monitored at the wellhead by a pressure sensor after the cumulative fracturing time t according to the formula (8).

In S5, a fluid pressure at a crack opening of each perforation cluster may be calculated based on the formula (9).

In S6, whether to carry out a temporary plugging operation may be determined based on a temporary plugging operation time T=3400 s and the cumulative fracturing time t, and a count of effective perforation clusters of the perforation clusters may be calculated. In response to determining that t<3400 s, it indicates that the temporary plugging operation is not carried out at the cumulative fracturing time t, and the count of effective perforation clusters of the perforation clusters is equal to the count of perforation clusters. In response to determining that t≥3400 s, it indicates that temporary plugging balls is put in to complete the temporary plugging operation before cumulative fracturing time t, and a count $m_i$ of effective perforation clusters of the i-th perforation cluster may be calculated based on the formula (11).

In S7, a perforation friction resistance coefficient $f_i$ of each of the perforation clusters may be calculated based on the formula (12).

In S8, a pressure balance equation may be established (e.g., the formula (13)), and a fracturing fluid instantaneous displacement $r_i$ of each of the perforation clusters may be solved using an arbitrary optimization algorithm.

S9, whether a fracturing construction is completed may be determined based on a total hydraulic fracturing time $T_a$=7300 s and the cumulative fracturing time t. In response to determining that the cumulative fracturing time t<7300 s, it indicates that the fracturing construction is not completed. The fracturing fluid displacement of each perforation cluster and the cumulative fracturing time may be updated respectively based on the formulas (14) and (15); then the operations S3-S9 may be repeatedly calculated until the cumulative fracturing time t≥the total hydraulic fracturing time $T_a$ is satisfied. In response to determining that the cumulative fracturing time t≥7300 s, it indicates that the fracturing construction is completed, and it proceeds to S10.

When the fracturing construction is completed, a final fracturing fluid displacement of each perforation cluster may be calculated to be 0.031, 0.033, 0.045, 0.037, 0.038, 0.037, and 0.046.

In S10, a variation coefficient of a fracturing fluid displacement distribution after the fracturing construction is completed may be calculated to be 0.1362.

In S11, a temporary plugging effect of fracturing may be evaluated according to the variation coefficient V=0.1362 of the fracturing fluid displacement distribution.

The calculated variation coefficient V of the fracturing fluid displacement distribution is ≤0.2, indicating that the difference in the fracturing fluid displacement of each of the perforation clusters is small, and the temporary plugging effect of fracturing in the target fracturing segment of the target oil-gas well is good.

Some embodiments of the present disclosure provide a method for evaluating a temporary plugging effect of fracturing in a low-permeability oil-gas reservoir based on monitoring pressure. The method comprehensively considers the calculation of the wellbore friction resistance during temporary plugging of fracturing, the impact of temporary plugging balls on plugging of a crack opening of each perforation cluster, and the impact of temporary plugging diversion on the expansion of a plurality of cracks, and constructs a numerical calculation model for unconventional segmented fracturing of the low-permeability oil-gas reservoir based on the monitoring pressure at the wellhead and considering the impact of temporary plugging diversion, so as to provide a scientific tool for evaluating the effect of the temporary plugging operation in unconventional segmented fracturing of the low-permeability oil-gas reservoir.

In some embodiments of the present disclosure, by correcting the calculation process based on the monitoring pressure data at the wellhead, the calculation accuracy of the fracturing fluid displacement of each perforation cluster before and after temporary plugging is improved, and the temporary plugging effect of fracturing is quantitatively evaluated based on the calculated variation coefficient, which can objectively and accurately determine the temporary plugging effect.

The method provided in some embodiments of the present disclosure is simple, easy to understand, and efficient in calculation, which can efficiently evaluate the temporary plugging effect of fracturing, thereby providing guidance for the subsequent optimization of temporary plugging of fracturing wells.

Figure 3:
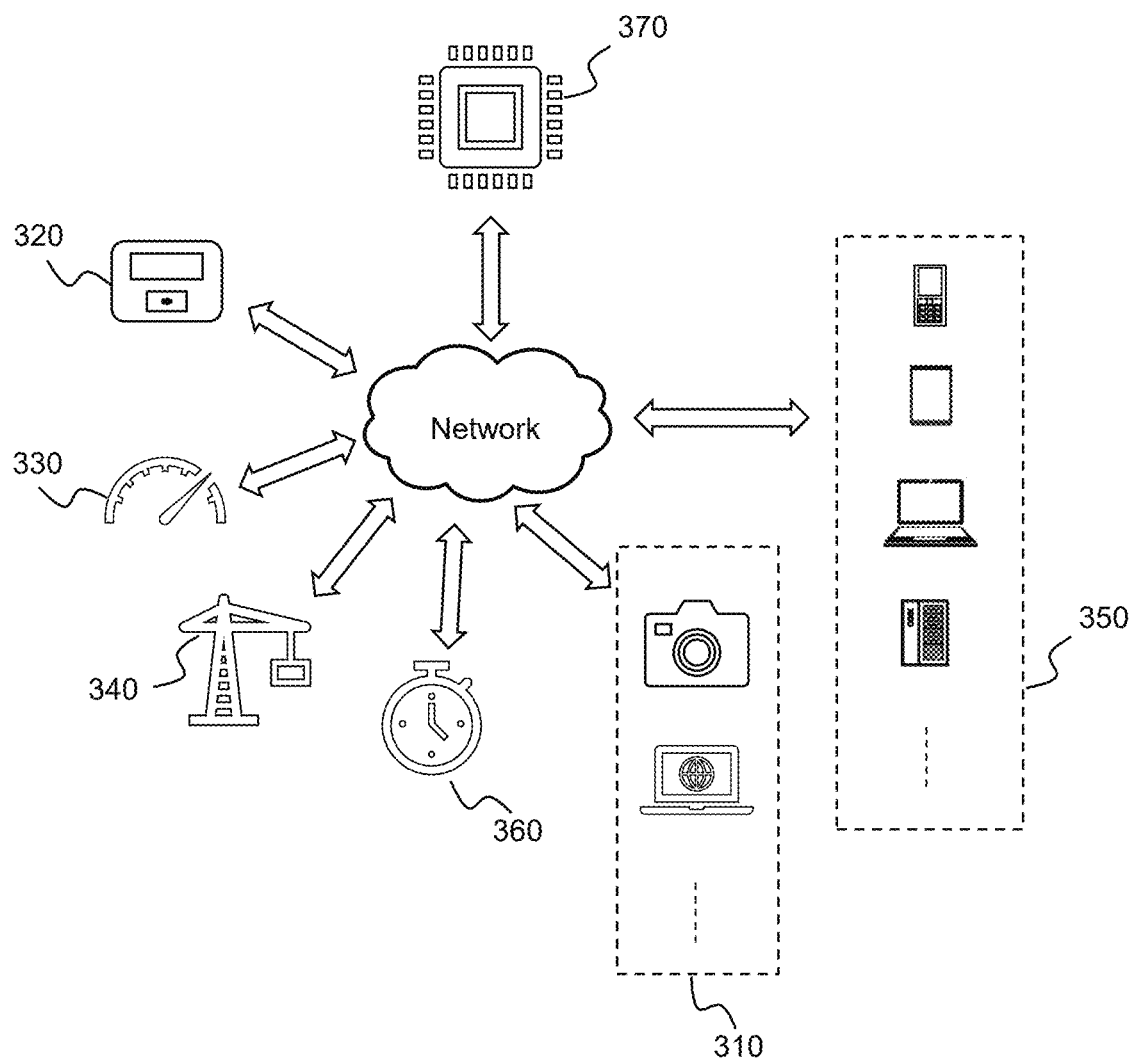
FIG. 3 is a schematic diagram illustrating a system for temporary plugging control of fracturing in a low-permeability oil-gas reservoir according to some embodiments of the present disclosure.

FIG. 3 is a schematic diagram illustrating a system for temporary plugging control of fracturing in a low-permeability oil-gas reservoir according to some embodiments of the present disclosure. As shown in FIG. 3, in some embodiments, a system 300 for temporary plugging control of fracturing in a low-permeability oil-gas reservoir (also referred to as "control system 300") may include an engineering monitoring device 310, a geological detection device 320, a pressure detection device 330, a temporary plugging operation device 340, a user terminal 350, a first timer 360, and the remote processor 370.

The engineering monitoring device 310 is a device for monitoring a mining engineering process. In some embodiments, the engineering monitoring device 310 may be deployed in a production line and configured to monitor a temporary plugging operation of fracturing (also referred to as "temporary plugging operation") or other operation processes in the mining process to obtain engineering data of a target oil-gas well. For example, the engineering monitoring device 310 may include but is not limited to at least one of a monitoring device and a manager terminal. The manager terminal is a terminal used by a manager of the mining process.

The geological detection device 320 is a device for acquiring geological data. In some embodiments, the geological detection device 320 may be deployed at a position of the target oil-gas well and configured to acquire geological data at the position of the target oil-gas well.

In some embodiments, the geological detection device 320 may include but is not limited to at least one of a geological radar and an electromagnetic instrument for identifying an underground rock formation and a mineral resource.

The pressure detection device 330 may be configured to obtain a wellhead pressure of the oil-gas well. In some embodiments, the pressure detection device 330 may be deployed at a wellhead of the oil-gas well. An exemplary pressure detection device 330 may be a pressure sensor.

The temporary plugging operation device 340 may be any device capable of completing the temporary plugging operation, and may be selected according to actual needs. For example, the temporary plugging operation device 340 may include components such as a pumping device, a bridge plug, a downhole sensor, a cable tool, a temporary plugging material (e.g., temporary plugging balls, and a chemical temporary plugging agent), a storage device, a packer, etc.

In some embodiments, the temporary plugging operation device 340 may be configured to perform the temporary plugging operation on a target well segment of the target oil-gas well.

The user terminal 350 is a terminal used by an on-site operator. The remote processor 370 may make the on-site operator grasp operation progress and process data in real time through the user terminal 350, and receive user input data from the on-site operator through the user terminal 350, thereby regulating the operation process of the temporary plugging operation device 340 based on the user input data.

The first timer 360 may be configured to obtain a fracturing time. The first timer 360 may be a clock timer. In some embodiments, in response to the start of a fracturing construction, the remote processor 370 may send a start timing instruction to the first timer 360, and control the first timer 360 to stop timing when the fracturing operation is completed to obtain the fracturing time.

In some embodiments, the control system 300 may further include a second timer. The second timer may be configured to obtain an operation duration of the temporary plugging operation. In some embodiments, the second timer may be a timer of the same type as the first timer.

The operation duration refers to a duration taken by the temporary plugging operation device to perform the temporary plugging operation.

The remote processor 370 may be configured to process data and/or information from the engineering monitoring device 310, the geological detection device 320, the pressure detection device 330, the temporary plugging operation device 340, the user terminal 350, the first timer 360, the second timer 380, and other external subjects of the control system 300, and control the temporary plugging operation device 340 to execute a program instruction based on the data, information, and/or a processing result to perform one or more projects described in some embodiments of the present disclosure.

In some embodiments, the remote processor 370 may obtain the engineering data and the geological data of the target oil-gas well, and determine a fracturing fluid displacement of each perforation cluster based on a count of perforation clusters in a target fracturing segment.

More descriptions regarding obtaining the engineering data and the geological data and determining the fracturing fluid displacement of each perforation cluster may be found in the operations S1-S2 of FIG. 1 and the related descriptions thereof.

In some embodiments, the remote processor 370 may perform data preparation and perform operation control after completing the data preparation.

In some embodiments, the remote processor 370 performing the data preparation may include: calculating a wellbore friction resistance from a wellhead to the target fracturing segment; obtaining a wellhead pressure through the pressure detection device to determine a wellbore pressure of the target fracturing segment; and determining a fluid pressure at a crack opening of each perforation cluster based on the fracturing fluid displacement of each perforation cluster, the engineering data, the geological data, and a cumulative fracturing time.

In some embodiments, the remote processor 370 may query historical data based on the engineering data of the target oil-gas well, determine a historical oil-gas well corresponding to historical engineering data that matches the engineering data, and determine the wellbore friction resistance from the wellhead to the target fracturing segment of the target oil-gas well based on a historical wellbore friction force from the wellhead to a historical fracturing segment corresponding to the historical oil-gas well. In some embodiments, when a similarity between the historical engineering data and the engineering data of the target oil-gas well is greater than a threshold, the remote processor 370 may determine that the historical engineering data matches the engineering data.

In some embodiments, the remote processor may determine the wellbore friction resistance based on a wellbore length from the wellhead to the target fracturing segment, a wellbore friction coefficient, a fracturing fluid density, a fracturing fluid flow rate in a wellbore, and an inner diameter of the wellbore through the formula (2). More descriptions may be found in operation S3 of FIG. 1 and the related descriptions thereof.

In some embodiments, the remote processor 370 may communicate with the pressure detection device disposed at the wellhead via a network, obtain the wellhead pressure collected by the pressure detection device, and determine the wellbore pressure of the target fracturing segment based on the wellhead pressure.

In some embodiments, the remote processor 370 may determine the wellbore pressure of the target fracturing segment by the formula (8) based on the wellhead pressure at the wellhead during the cumulative fracturing time, the wellbore friction resistance, and a wellbore hydrostatic fluid column pressure from the wellhead to the target fracturing segment. More descriptions may be found in the operation S4 of FIG. 1 and the related descriptions thereof.

In some embodiments, the remote processor 370 may determine the fluid pressure at the crack opening of each perforation cluster based on the fracturing fluid displacement of each perforation cluster, the engineering data, the geological data, and the cumulative fracturing time.

In some embodiments, the remote processor 370 may match an engineering feature vector corresponding to the target oil-gas well in a reference pressure database, and determine the fluid pressure at the crack opening of each perforation cluster based on a pressure label corresponding to a reference engineering feature vector with the highest similarity to the engineering feature vector.

The engineering feature vector may be constructed based on data corresponding to the target oil-gas well, and elements of the engineering feature vector may include the fracturing fluid displacement of each perforation cluster corresponding to the target oil-gas well, the engineering data, the geological data, and the cumulative fracturing time.

The reference pressure database may include at least one reference engineering feature vector and a pressure label corresponding to the at least one reference engineering feature vector, which may be constructed based on historical temporary plugging operation data. Elements of the at least one reference engineering feature vector may include a historical fracturing fluid displacement of each perforation cluster corresponding to a historical oil-gas well, historical engineering data, historical geological data, and a historical cumulative fracturing time. The pressure label corresponding to the at least one reference engineering feature vector may be obtained through a pressure sensor deployed at the crack opening of each perforation cluster in the historical temporary plugging operation.

In some embodiments, the remote processor 370 may determine the fluid pressure at the crack opening of each perforation cluster by formula (9) based on a fracturing fluid viscosity, a Young's modulus of reservoir rock, a Poisson's ratio of the reservoir rock, the fracturing fluid displacement of each perforation cluster, a thickness of the oil-gas layer, and the cumulative fracturing time. More descriptions may be found in the operation S5 of FIG. 1 and the related descriptions thereof.

In some embodiments, the remote processor 370 performing the operation control may include: determining an operation instruction based on the temporary plugging operation time and the cumulative fracturing time; sending the operation instruction to the user terminal in response to the operation instruction being non-null; obtaining an execution instruction corresponding to the operation instruction from the user terminal; sending the execution instruction to the temporary plugging operation device to control the temporary plugging operation device to operate based on an initial operation parameter; determining a count of effective perforation clusters of the perforation clusters; determining a friction resistance coefficient of each perforation cluster; determining a fracturing fluid instantaneous displacement of each perforation cluster based on the fluid pressure at the crack opening of each perforation cluster, the wellbore friction resistance, and the wellbore pressure; and determining whether the fracturing construction is completed based on a total hydraulic fracturing time and the cumulative fracturing time.

The operation instruction is an instruction used to instruct the temporary plugging operation device to start the temporary plugging operation.

In some embodiments, the remote processor 370 may determine the operation instruction based on the temporary plugging operation time and the cumulative fracturing time. In response to determining that the cumulative fracturing time is not less than the temporary plugging operation time, it indicates that temporary plugging balls are put in to perform the temporary plugging operation. In this case, the operation instruction is not determined and the operation instruction is null. In response to determining that the cumulative fracturing time is less than the temporary plugging operation time, it indicates that the temporary plugging operation is not carried out at this time. In this case, the operation instruction needs to be determined and the operation instruction is non-null.

In some embodiments, in response to determining that a hydraulic pressure variation coefficient is greater than a preset threshold, the remote processor 370 may determine the operation instruction. The hydraulic pressure variation coefficient may be determined based on the fracturing fluid instantaneous displacement of each perforation cluster and the total fracturing fluid displacement.

The hydraulic pressure variation coefficient is a numerical value that reflects a variation in a fracturing fluid displacement distribution during the hydraulic fracturing process.

In some embodiments, the process of determining the hydraulic pressure variation coefficient is similar to the process of determining the variation coefficient of the fracturing fluid displacement distribution after the fracturing construction is completed, which may be found in the related descriptions of formula (16) in FIG. 1.

In some embodiments, in response to determining that the hydraulic pressure variation coefficient is greater than the preset threshold, the operation instruction may be determined to start the temporary plugging operation.

In some embodiments, the remote processor 370 may determine the preset threshold in various ways. For example, the remote processor 370 may select samples with a relatively high variation coefficient from historical data, perform statistical analysis on the samples, and determine a statistical result as the preset threshold. A statistical process may include but is not limited to calculating a mean or a median value.

In some embodiments, the preset threshold may be correlated with a fracturing quality requirement.

The fracturing quality requirement refers to a quality requirement put forward by a user for the effect of the fracturing operation, which may be determined based on the input of the on-site operator.

In some embodiments, the fracturing quality requirement may be negatively correlated with the preset threshold. For example, the higher the fracturing quality requirement, the lower the preset threshold.

In some embodiments of the present disclosure, the preset threshold may be dynamically set according to different fracturing quality requirements. For example, the higher the fracturing quality requirement, the lower the preset threshold, the more likely the variation coefficient exceeds the preset threshold, and the remote processor dynamically adjusts the operation parameter more frequently to ensure a high-quality effect, thereby ensuring that the operation effect can be close to user requirements.

In some embodiments of the present disclosure, in response to determining that the hydraulic pressure variation coefficient is greater than the preset threshold, it indicates that the pressure distribution is uneven, which may lead to insufficient development of some cracks or excessive fracturing fluid absorption in dominant cracks. By making the hydraulic pressure variation coefficient be greater than the preset threshold to trigger the operation instruction, the pressure distribution can be improved, the crack development effect can be optimized, unnecessary temporary plugging operations can be effectively reduced, the construction costs can be reduced, the construction efficiency can be improved, and the uniformity of crack development can be significantly improved.

In some embodiments, the remote processor 370 may control the temporary plugging operation device 340 to perform an operation according to the initial operation parameter based on the operation instruction.

The initial operation parameter is a preset operation parameter of the temporary plugging operation device 340, and may include at least one of a particle size distribution and a count of the temporary plugging balls, and a pumping rate of the temporary plugging operation device.

The temporary plugging balls are spherical plugging tools used in the temporary plugging operation. For example, when drilling a well and injecting fracturing fluid into an underground rock formation, cracks may form in the geosphere. The temporary plugging operation device may use the temporary plugging balls to temporarily plug the cracks. The temporary plugging balls automatically degrade over time to avoid affecting oil-gas production.

The particle size distribution refers to a diameter range and proportion distribution of the temporary plugging balls.

In some embodiments, the particle size distribution and the count of the temporary plugging balls may be preset based on prior experience and/or actual needs.

The pumping rate refers to a rate at which fluid is injected into the temporary plugging ball, which can be expressed by a total volume of fluid injected into the temporary plugging ball per unit of time.

In some embodiments, the pumping rate may be preset based on prior experience and/or actual needs.

In some embodiments, the remote processor 370 may determine the count of effective perforation clusters of the perforation clusters based on the count of perforation clusters corresponding to the target fracturing segment, the fracturing fluid displacement of each perforation cluster, and the engineering data of the target oil-gas well.

In some embodiments, the remote processor 370 may match the perforation feature vector corresponding to the target oil-gas well in a reference effective database, and determine the count of effective perforation clusters of the perforation clusters based on a reference effective count corresponding to a reference perforation feature vector having the highest similarity to the perforation feature vector.

The perforation feature vector may be constructed based on data corresponding to the target oil-gas well, and elements of the perforation feature vector may include the count of perforation clusters corresponding to the target fracturing segment in the target oil-gas well, the fracturing fluid displacement of each perforation cluster, and the engineering data of the target oil-gas well.

The reference effective database may include at least one reference perforation feature vector and a reference effective count corresponding to the at least one reference perforation feature vector, and may be constructed based on historical temporary plugging operation data. Elements of the at least one reference perforation feature vector may include a historical count of perforation clusters corresponding to the historical fracturing segment in the historical oil-gas well, a historical fracturing fluid displacement of each perforation cluster, and historical engineering data of the historical oil-gas well. The label corresponding to the at least one reference perforation feature vector may be determined based on the count of effective perforation clusters determined by the on-site operator in the historical temporary plugging operation.

In some embodiments, the remote processor 370 may determine the count of effective perforation clusters of the perforation clusters based on the cumulative fracturing time and the temporary plugging operation time according to at least one of the count of perforation clusters, the count of temporary plugging balls, the fracturing fluid displacement of each perforation cluster, and the total fracturing fluid displacement through formula (10) or formula (11). More descriptions may be found in the operation S6 of FIG. 1 and the related descriptions thereof.

In some embodiments, the remote processor 370 may determine the friction resistance coefficient of each perforation cluster in various ways.

For example, the remote processor 370 may determine a historical oil-gas well corresponding to historical engineering data that matches the engineering data by querying the historical data based on the engineering data of the target oil-gas well, and determine the friction resistance coefficient of each perforation cluster in the target oil-gas well based on a historical resistance coefficient corresponding to each historical perforation cluster in the historical oil-gas well.

In some embodiments, the remote processor 370 may determine the friction resistance coefficient of each perforation cluster based on the count of effective perforation clusters, a perforation aperture of each perforation in the perforation cluster, and a fracturing fluid density according to formula (12). More descriptions may be found in the operation S7 of FIG. 1 and the related descriptions thereof.

In some embodiments, the remote processor 370 may determine the fracturing fluid instantaneous displacement of each perforation cluster based on the fluid pressure at the crack opening, the wellbore friction resistance, and the wellbore pressure.

In some embodiments, the remote processor 370 may match a pressure feature vector corresponding to the crack opening of each perforation cluster in a reference displacement database, and determine the fracturing fluid instantaneous displacement of each perforation cluster based on a displacement label corresponding to a reference pressure feature vector with the highest similarity to the pressure feature vector.

The pressure feature vector may be constructed based on data corresponding to the perforation clusters in the target oil-gas well, and elements of the pressure feature vector may include the fluid pressure at the crack opening of each perforation cluster, the wellbore friction resistance of the perforation cluster, and the wellbore pressure.

The reference displacement database may include at least one reference pressure feature vector and a reference displacement corresponding to the at least one reference pressure feature vector, and may be constructed based on historical temporary plugging operation data. Elements of the at least one reference pressure feature vector may include a historical fluid pressure at the crack opening of each perforation cluster in the historical oil-gas well, a historical friction resistance of the wellbore corresponding to each perforation cluster, and a historical wellbore pressure. The displacement label corresponding to the at least one reference pressure feature vector may be obtained based on a sensor disposed at the crack opening of each perforation cluster in the historical temporary plugging operation.

In some embodiments, the remote processor 370 may determine the fracturing fluid instantaneous displacement of each perforation cluster by solving a pressure balance equation. More descriptions may be found in the operation S8 of FIG. 1 and the related descriptions thereof.

In some embodiments, the remote processor 370 may determine whether the fracturing operation is completed based on the total hydraulic fracturing time and the cumulative fracturing time. In response to determining that the cumulative fracturing time is less than the total hydraulic fracturing time, it indicates that the fracturing construction is not completed.

The total hydraulic fracturing time refers to a total time spent on the hydraulic fracturing operation, which includes a fracturing duration (also referred to as a duration of fracturing) and an operation duration (also referred to as a duration of operation).

In some embodiments, the remote processor 370 may determine an end time point of the fracturing construction based on the fracturing duration and the operation duration. In response to determining that a current time point is earlier than the end time point, it is determined that the fracturing construction is not completed. In response to determining that the current time point is not earlier than the end time point, it is determined that the fracturing construction is completed.

In some embodiments, the remote processor 370 may add the fracturing duration and the operation duration to a start time point of the fracturing construction to determine the end time point of the fracturing construction.

The fracturing duration may be preset based on prior experience and/or actual needs, and the operation duration may be obtained through the second timer.

More descriptions determining whether the fracturing construction is completed may be found in the operation S9 of FIG. 1 and the related descriptions thereof.

In some embodiments, in response to determining that the fracturing construction is not completed, the remote processor 370 may update the cumulative fracturing time, and update the fracturing fluid displacement of each perforation cluster based on the fracturing fluid displacement and an updated cumulative fracturing time, and perform the data preparation and the operation control again.

In some embodiments, the remote processor 370 may obtain a current fracturing time collected by the first timer, and update the cumulative fracturing time based on the current fracturing time. For example, the remote processor 370 may determine the updated cumulative fracturing time based on a sum of the cumulative fracturing time and the current fracturing time collected by the first timer.

In some embodiments, the remote processor 370 may update the fracturing fluid displacement of each perforation cluster according to formula (14) based on a current fracturing fluid displacement of each perforation cluster, the cumulative fracturing time, and a time step size; and update the cumulative fracturing time based on the current cumulative fracturing time and the time step size. More descriptions may be found in the operation S9 of FIG. 1 and the related descriptions thereof.

In some embodiments, in response to determining that the fracturing construction is completed, the remote processor 370 may calculate the variation coefficient of the fracturing fluid displacement distribution after the fracturing construction is completed based on the fracturing fluid instantaneous displacement of each perforation cluster, the fracturing fluid displacement of each perforation cluster, and the count of perforation clusters in the target fracturing segment. More descriptions may be found in the operation S10 of FIG. 1 and the related descriptions thereof.

In some embodiments, the remote processor 370 may determine an effective value of temporary plugging of fracturing according to the variation coefficient of the fracturing fluid displacement distribution.

The effective value of temporary plugging of fracturing is data used to evaluate the temporary plugging effect of fracturing. More descriptions regarding determining the temporary plugging effect of fracturing may be found in the operation S11 of FIG. 1 and the related descriptions thereof.

In some embodiments, the remote processor 370 may adjust the initial operation parameter based on the effective value to obtain a target operation parameter, and send the target operation parameter to the temporary plugging operation device 340 via the network to control the temporary plugging operation device 340 to operate according to the target operation parameter when a next operation starts.

In some embodiments, in response to determining that the effective value is not less than a preset effective threshold, it indicates that the initial operation parameter can satisfy a temporary plugging operation requirement, and the initial operation parameter is not adjusted at this time. In response to determining that the effective value is less than the effective threshold, it indicates that the initial operation parameter cannot satisfy the temporary plugging operation requirement, and the pumping rate needs to be reduced at this time to avoid geosphere rupture caused by excessive pressure during the pumping process.

Figure 4:
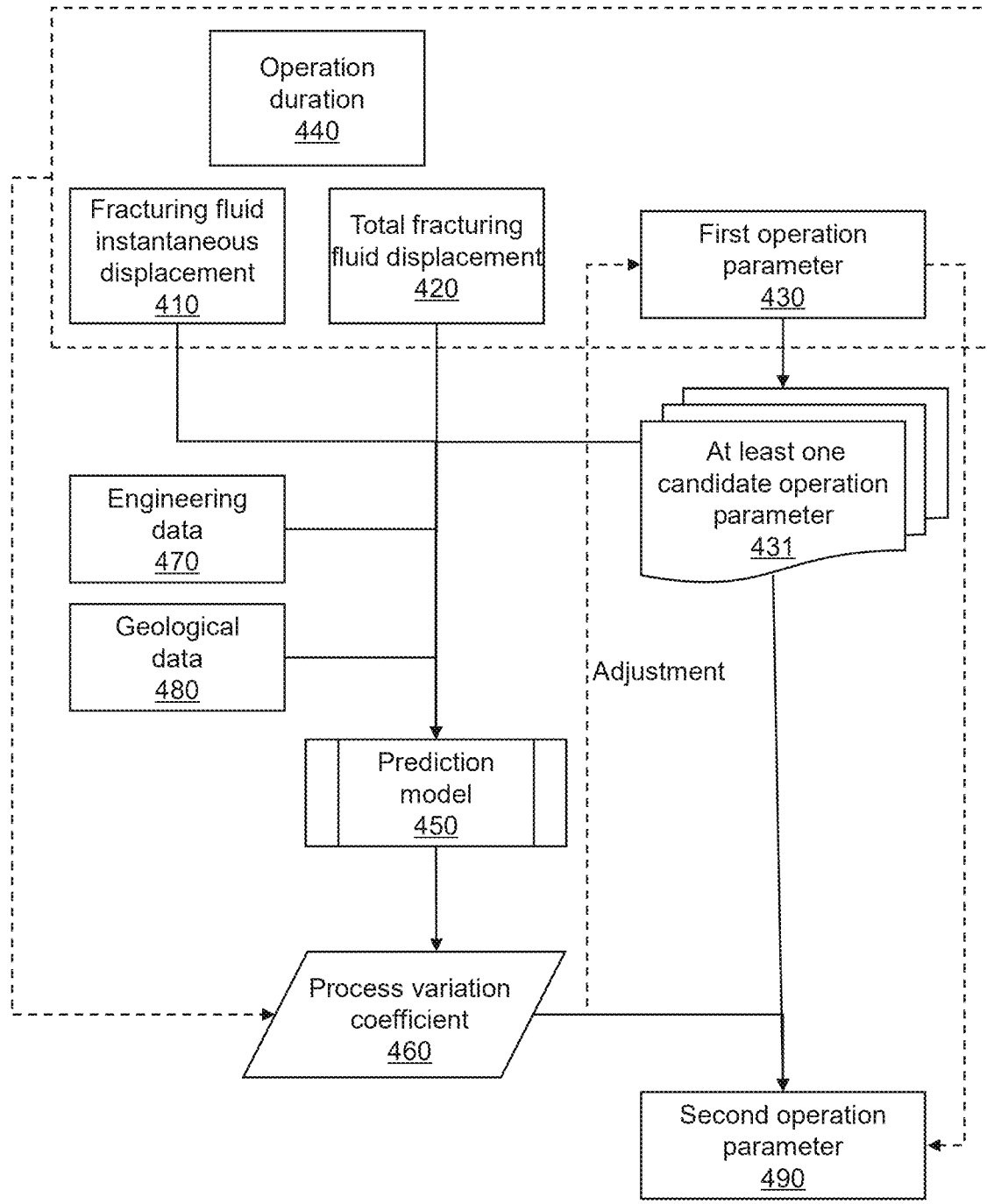
FIG. 4 is a schematic diagram illustrating a process for determining operation parameters of a temporary plugging operation device according to some embodiments of the present disclosure.

FIG. 4 is a schematic diagram illustrating a process for determining operation parameters of a temporary plugging operation device according to some embodiments of the present disclosure. As shown in FIG. 4, the process of determining the operation parameter of the temporary plugging operation device may include the following contents. In some embodiments, the process of determining the operation parameter of the temporary plugging operation device may be performed by the remote processor 370.

In some embodiments, the remote processor 370 may periodically adjust a first operation parameter during the operation of the temporary plugging operation device.

The first operation parameter refers to an operation parameter currently used by the temporary plugging operation device.

In some embodiments, the first operation parameter may include an initial operation parameter, or an operation parameter of the temporary plugging operation device in a current cycle.

In some embodiments, the remote processor 370 may communicate with the temporary plugging operation device 340 via a network to obtain the first operation parameter of the temporary plugging operation device 340.

In some embodiments, the remote processor 370 may periodically adjust the first operation parameter of the temporary plugging operation device. An adjustment cycle may be preset based on prior experience and/or actual needs.

In some embodiments, adjusting the first operation parameter of the temporary plugging operation device may include: determining a process variation coefficient 460 of a preset future time period based on a fracturing fluid instantaneous displacement 410, a total fracturing fluid displacement 420, a first operation parameter 430 of the current cycle, and an operation duration 440; and determining a second operation parameter 490 of the temporary plugging operation device based on the process variation coefficient 460.

In some embodiments, the remote processor 370 may communicate with the second timer via a network to obtain the operation duration collected by the second timer.

The process variation coefficient is a numerical value that reflects the variation degree of the fracturing fluid displacement distribution during the temporary plugging operation.

In some embodiments, the remote processor 370 may determine the process variation coefficient of the preset future time period based on the fracturing fluid instantaneous displacement of each perforation cluster, the total fracturing fluid displacement, and the first operation parameter.

For example, the remote processor 370 may construct a vector to be matched based on a current fracturing fluid instantaneous displacement of each perforation cluster, the total fracturing fluid displacement, and the operation duration; determine a similarity between the vector to be matched and each of a plurality of historical vectors, and calculate the process variation coefficient of the preset future time period using a variation coefficient formula based on the fracturing fluid instantaneous displacement of each perforation cluster and the total fracturing fluid displacement in a subsequent cycle corresponding to a historical vector with the highest similarity. More descriptions regarding the variation coefficient formula may be found in the related descriptions of FIG. 1.

The plurality of historical vectors may be constructed based on a historical fracturing fluid instantaneous displacement of fracturing fluid, a historical total fracturing fluid displacement, and a historical operation duration corresponding to a historical temporary plugging operation using the first operation parameter in the historical data. The similarity may be determined based on a distance between the vectors.

The second operation parameter is an adjusted operation parameter of the temporary plugging operation device. In some embodiments, the second operation parameter may be applied to a next cycle of the temporary plugging operation.

In some embodiments, the remote processor 370 may determine the second operation parameter based on the process variation coefficient in various ways. For example, when the process variation coefficient of the preset future time period increases compared to the process variation coefficient of the first operation parameter, a pumping rate in the first operation parameter may be reduced, and the uniformity of a particle size distribution of temporary plugging balls may be improved, and the second operation parameter may be determined based on an adjusted pumping rate and an adjusted particle size distribution of the temporary plugging balls.

In some embodiments, the remote processor 370 may determine the temporary plugging effect of fracturing based on the process variation coefficient. When the temporary plugging effect of fracturing is "poor", the pumping rate in the first operation parameter may be reduced, and the uniformity of the particle size distribution of the temporary plugging balls may be improved so as to determine the second operation parameter.

More descriptions regarding evaluating the temporary plugging effect of fracturing may be found in the operation S11 of FIG. 1 and the related descriptions thereof.

In some embodiments of the present disclosure, as the temporary plugging operation proceeds, the pressure and stress distribution of the geosphere change, and the operation parameter of the temporary plugging operation device may gradually become incompatible with an actual operation condition. For example, if the particle size distribution of the temporary plugging balls is uneven, some cracks may be over-plugged while other cracks may not be plugged, which affects the expansion effect of the cracks; an excessive pumping rate may cause the temporary plugging balls to flow too fast in the fluid, making it difficult to form stable plugging, which leads to waste of materials. By periodically adjusting the first operation parameter and determining the second operation parameter based on the process variation coefficient, it is possible to quickly respond to the variation in the operation parameter during the operation and avoid poor operation effect caused by uneven crack development.

In some embodiments, the remote processor 370 may determine at least one candidate operation parameter 431 based on the first operation parameter 430; determine at least one process variation coefficient corresponding to the at least one candidate operation parameter through a prediction model; and determine the second operation parameter from the at least one candidate operation parameter based on the at least one process variation coefficient.

The candidate operation parameter refers to a parameter that serve as an alternative to the second operation parameter. In some embodiments, one or more candidate operation parameters may be provided.

In some embodiments, the remote processor 370 may form one or more candidate operation parameters by performing multiple random variations on random sub-parameters of the first operation parameter. The random sub-parameter may be any sub-parameter of the first operation parameter, such as the pumping rate, the particle size distribution of the temporary plugging balls, the count of temporary plugging balls, etc.

For example, the remote processor 370 may randomly change the count of temporary plugging balls in the first operation parameter from 10 to 12 or 8, or randomly change the pumping rate from 5 $m^3/s$ to 4.8 $m^3/s$ or 5.2 $m^3/s$, etc.

In some embodiments, the remote processor 370 may determine the at least one process variation coefficient corresponding to the at least one candidate operation parameter in a preset future time period through a prediction model based on the fracturing fluid instantaneous displacement of each perforation cluster, the total fracturing fluid displacement, the engineering data, and the geological data of the target oil-gas well.

In some embodiments, the prediction model may be a machine learning model, such as a long short term memory network (LSTM), etc.

In some embodiments, as shown in FIG. 4, an input of the prediction model may include the at least one candidate operation parameter 431, the fracturing fluid instantaneous displacement 410, the total fracturing fluid displacement 420, and the engineering data 470 and the geological data 480 of the target oil-gas well. An output of the prediction model 450 may include the at least one process variation coefficient 460 corresponding to the at least one candidate operation parameter in the preset future time period.

In some embodiments, training samples of the prediction model may include a sample operation parameter, a sample fracturing fluid instantaneous displacement of each perforation cluster, a sample total fracturing fluid displacement, and sample engineering data and sample geological data of a sample oil-gas well. Training labels corresponding to the training samples may include a sample variation coefficient.

In some embodiments, the training samples may be determined based on a historical operation parameter, a historical fracturing fluid instantaneous displacement of each perforation cluster, a historical total fracturing fluid displacement, historical engineering data, and historical geological data corresponding to at least one historical temporary plugging operation in the historical data. The training labels corresponding to the training samples may be determined based on process data corresponding to the historical temporary plugging operation through a variation coefficient calculation formula. More descriptions regarding the variation coefficient calculation formula may be found in the operation S10 of FIG. 1 and the related descriptions thereof.

In some embodiments, the remote processor 370 may divide the training samples into at least one sample group based on the sample engineering data and sample geological data of the sample oil-gas well. For one of the at least one sample group, the sample group may be divided into a training set and a test set according to a preset ratio; an initial prediction model may be trained to obtain a prediction model based on the training set and the test set of the at least one sample group. A learning rate of the sample group may be correlated with a sample effective value of temporary plugging of fracturing corresponding to the sample group.

In some embodiments, the remote processor 370 may divide the sample engineering data into a plurality of engineering levels according to a preset criterion based on the sample engineering data of the sample oil-gas well; divide the sample geological data into a plurality of geological levels according to a preset criterion based on the sample geological data of the sample oil-gas well; and combine the divided sample engineering data and the divided sample geological data in pairs based on the engineering levels and the geological levels to form a plurality of combined levels. For example, if the engineering data contains m levels and the geological data contains n levels, m×n levels may be formed.

In some embodiments, the remote processor 370 may divide the sample data according to the combined levels to determine at least one sample group, and determine at least one sample group label corresponding to the at least one sample group based on the engineering levels and geological levels corresponding to the at least one sample group. For example, if the engineering level corresponding to sample data A is 2 and the geological level corresponding to the sample data A is 1, the remote processor may divide the sample data A into a sample group with a sample group label of 2*1.

In some embodiments, the remote processor 370 may divide the sample data based on other criteria, which may be determined based on actual needs.

In some embodiments, the remote processor 370 may divide the sample group into the training set and the test set based on a preset ratio. The preset ratio may be set based on prior experience. For example, a ratio of the training set to the test set may be 7:3.

The training set may be used to train the initial prediction model, and the test set may be used to test a training result of the initial prediction model.

In some embodiments, different sample groups may correspond to different prediction models, and the remote processor 370 may train the initial prediction model based on the training set and the test set of the at least one sample group to obtain the prediction model. For example, the remote processor 370 may obtain a training set consisting of a plurality of training samples with training labels, and perform a plurality of iterations based on the training set. At least one of the iterations may include: selecting one or more training samples from the training set, inputting the one or more training samples into the initial prediction model to obtain model outputs corresponding to the one or more training samples; constructing a loss function based on the model outputs corresponding to the one or more training samples and the training labels corresponding to the one or more training samples; iteratively updating parameters of the initial prediction model based on the loss function until an iteration end condition is satisfied to end the iteration, testing a current training result based on the test set, and determining a trained prediction model based on a test result. Iteratively updating the model parameters of the initial prediction model may be performed in various ways. For example, the model parameters of the initial prediction model may be iteratively updated based on gradient descent. The iteration end condition may include that the loss function converges, or a count of iterations reaches an iteration count threshold, etc.

In some embodiments, the remote processor 370 may determine the learning rate corresponding to the training samples in the sample group according to the effective value of temporary plugging of fracturing and a current iteration corresponding to the sample group to which the training samples belong.

In some embodiments, the learning rate corresponding to the training samples may be positively correlated with the effective value of temporary plugging of fracturing of the sample group to which the training samples belong, and negatively correlated with the count of iterations. For example, in the training process of the prediction model, the smaller the count of iterations, the higher the effective value of temporary plugging of fracturing corresponding to the training samples, and the larger the learning rate factor.

In some embodiments of the present disclosure, by classifying and sampling from the engineering data and the geological data of different oil-gas wells in the training samples, model training deviation caused by data deviation can be avoided, the generalization ability and applicability of the model can be effectively improved, the balanced distribution of each sample type in the training set and the test set can be guaranteed, and the quality of model training can be improved. By dynamically adjusting the learning rate according to the effective value of temporary plugging of fracturing, the convergence speed of the model can be accelerated. For example, the higher the effective value of temporary plugging of fracturing, the higher the sample quality, thus the learning of the implicit rules of high-quality samples can be strengthened, thereby improving the efficiency and effect of model training.

In some embodiments, the remote processor 370 may determine the second operation parameter from the at least one candidate operation parameter based on the at least one process variation coefficient. For example, the remote processor may determine a candidate operation parameter with the smallest process variation coefficient as the second operation parameter.

In some embodiments of the present disclosure, by generating a plurality of candidate operation parameters and using the trained prediction model, the subsequent variation coefficient of each candidate operation parameter can be evaluated, and the second operation parameter can be determined from the plurality of candidate operation parameters, thereby reducing blind attempts or unnecessary adjustments, and effectively improving the effect of the temporary plugging operation.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure and are within the spirit and scope of the exemplary embodiments of this disclosure.

Moreover, certain terminology has been used to describe embodiments of the present disclosure. For example, the terms "one embodiment," "an embodiment," and "some embodiments" mean that a particular feature, structure, or feature described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or features may be combined as suitable in one or more embodiments of the present disclosure.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

Finally, it should be understood that the embodiments described in the present disclosure are only used to illustrate the principles of the embodiments of the present disclosure. Other variations may also fall within the scope of the present disclosure. Therefore, as an example and not a limitation, alternative configurations of the embodiments of the present disclosure may be regarded as consistent with the teaching of the present disclosure. Accordingly, the embodiments of the present disclosure are not limited to the embodiments introduced and described in the present disclosure explicitly.

What is claimed is:

1. A method for evaluating a temporary plugging effect of fracturing in a permeability oil-gas reservoir based on monitoring pressure, wherein the method is executed by a remote processor of a control system, wherein the control system further includes an engineering monitoring device, a geological detection device, a pressure detection device, a temporary plugging operation device, a user terminal, and a first timer; the engineering monitoring device is deployed in a production line and includes at least one of a monitoring device and a manager terminal; the geological detection device is deployed at a position of a target oil-gas well; the pressure detection device includes a pressure sensor; the temporary plugging operation device is configured to perform a temporary plugging operation on a target well segment of the target oil-gas well and includes at least one of a pumping device, a bridge plug, a downhole sensor, a cable tool, a temporary plugging material, a storage device, and a packer; the user terminal is configured to enable a field operator to grasp a process of the temporary plugging operation and process data in real time, and to receive a user input data from the field operator, so as to regulate the process of the temporary plugging operation combined with the user input data, the method comprising operations:

S1, collecting engineering data of the target oil-gas well via the engineering monitoring device and geological data via the geological detection device of the target oil-gas well;

S2, determining, based on a count of perforation clusters in a target fracturing segment, a fracturing fluid displacement of each perforation cluster;

S3, calculating a wellbore friction resistance along a way from a wellhead to the target fracturing segment;

S4, communicating with the pressure detection device deployed at the wellhead via a network and obtaining a wellhead pressure monitored at the wellhead in real time via the pressure detection device, and calculating, a wellbore pressure at the target fracturing segment based on the wellhead pressure;

S5, calculating a fluid pressure at a crack opening of each perforation cluster according to following formula based on the fracturing fluid displacement of each perforation cluster, a fracturing fluid viscosity, a Young's modulus of reservoir rock, a Poisson's ratio of the reservoir rock, a thickness of an oil-gas layer, and a cumulative fracturing time, wherein the cumulative fracturing time is obtained based on the first timer, and obtaining the cumulative fracturing time includes:

in response to a start of a fracturing construction, sending a start timing instruction to the first timer and controlling the first timer to stop timing when the fracturing construction is completed to obtain the cumulative fracturing time;

$$p_i = 1.1 \left[ \frac{\mu E^4 q_i^2}{(1-v^4)H^6} \right]^{1/5} t^{1/5}$$

where $p_i$ denotes the fluid pressure at the crack opening of an i-th perforation cluster, measured in Pascals (Pa); $\mu$ denotes a fracturing fluid viscosity, measured in Pascals·second (Pa·s); E denotes the Young's modulus of the reservoir rock, measured in Pa; $v$ denotes the Poisson's ratio of the reservoir rock; $q_i$ denotes the fracturing fluid displacement of the i-th perforation cluster, measured in cubic meters per second (m³/s); H denotes the thickness of the oil-gas layer, measured in meters (m); and t denotes the cumulative fracturing time, measured in seconds(s);

S6, determining an operation instruction . . . wherein injecting the temporary plugging material to plug the cracks comprises: controlling, during injecting the plugging material, a count of temporary plugging balls, a diameter range and a distribution ratio of the temporary plugging balls and an injection rate of the temporary plugging balls based on initial operation parameters including a particle size distribution and a number of the temporary plugging balls, a pumping rate of the temporary plugging operation device, and a rate of the temporary plugging balls injected; and determining a count of effective perforation clusters;

in response to determining that the cumulative fracturing time is less than the temporary plugging operation time, determining that the count of effective perforation clusters is equal to the count of perforation clusters;

in response to determining that the cumulative fracturing time is greater than or equal to the temporary plugging operation time, determining the count of effective perforation clusters according to formula:

$$m_i = n - \left\lfloor R \frac{q_i}{Q} \right\rfloor$$

where $m_i$ denotes the count of effective perforation clusters of the i-th perforation cluster; n denotes the count of perforation clusters; R denotes the count of temporary plugging balls; $q_i$ denotes the fracturing fluid displacement of the i-th perforation cluster, measured in m³/s; and Q denotes a total fracturing fluid displacement, measured in m³/s;

S7, calculating, based on the count of effective perforation clusters, a perforation friction resistance coefficient of each perforation cluster;

S8, establishing a pressure balance equation, and solving a fracturing fluid instantaneous displacement of each perforation cluster using an arbitrary optimization algorithm:

$$F = \sum_{i=1}^{N}(p_i + f_i r_i^2 - p_s)^2$$

where F denotes a value of the pressure balance equation, measured in Pa²; $p_i$ denotes the fluid pressure at the crack opening of the i-th perforation cluster, measured in Pa; $f_i$ denotes a perforation friction resistance of the i-th perforation cluster, measured in Pa; $r_i$ denotes the fracturing fluid instantaneous displacement of the i-th perforation cluster, measured in m³/s; and $p_s$ denotes the wellbore pressure at the target fracturing segment, measured in Pa;

S9, determining whether the fracturing construction is completed based on a total hydraulic fracturing time and the cumulative fracturing time, in response to determining that the fracturing construction is not completed, updating the fracturing fluid displacement of each perforation cluster and the cumulative fracturing time, and repeating the operations S3-S9 until the fracturing construction is completed;

S10, calculating, based on the fracturing fluid instantaneous displacement of each perforation cluster, a variation coefficient of a fracturing fluid displacement distribution after the fracturing construction is completed according to formula:

$$V = \frac{N\sqrt{\frac{1}{N}\sum_{i=1}^{N}(q_i - Q/N)^2}}{Q}$$

where V denotes the variation coefficient of the fracturing fluid displacement distribution; N denotes the count of perforation clusters in the target fracturing segment; $q_i$ denotes the fracturing fluid displacement of the i-th perforation cluster, measured in m³/s; and Q denotes the total fracturing fluid displacement, measured in m³/s; and S11, determining an effective value of temporary plugging of fracturing based on the variation coefficient of the fracturing fluid displacement distribution, wherein the effective value of temporary plugging of fracturing is a data value used to evaluate the temporary plugging effect of the fracturing, in response to the effective value being less than an effective threshold, reducing the pumping rate, adjusting the initial operation parameters based on the effective value to obtain a target operation parameter, and sending the target operation parameter to the temporary plugging operation device via the network and controlling the temporary plugging operation device to operate based on the target operation parameter when a next operation starts, wherein controlling the temporary plugging operation device to operate comprises:

injecting the temporary plugging material to plug the cracks to adjust the flow direction of the fracturing fluid, thereby avoiding formation fracture caused by excessive pressure during pumping.

2. The method of claim 1, wherein the engineering data includes a wellbore length L from the wellhead to the target fracturing segment, a wellbore hydrostatic fluid column pressure $p_g$ from the wellhead to the target fracturing segment, an inner diameter D of a wellbore, a fracturing fluid flow rate $v_p$ in the wellbore, an internal roughness ε of the wellbore, the count n of perforation clusters, a perforation aperture d, a pumping sand ratio $\varepsilon_p$, the total fracturing fluid displacement Q, the fracturing fluid viscosity µ, a fracturing fluid density ρ, the temporary plugging operation time T, the count R of temporary plugging balls, and the total hydraulic fracturing time $T_a$; and the geological data includes the Young's modulus E of the reservoir rock, the Poisson's ratio ν of the reservoir rock, and the thickness H of the oil-gas layer.

3. The method of claim 1, wherein a calculation formula in the operation S3 is expressed as:

$$p_f = L \cdot s \cdot \frac{\rho}{2} \frac{v_p^2}{D}$$

where $p_f$ denotes the wellbore friction resistance along the way from the wellhead to the target fracturing segment, measured in Pa; L denotes a length of a wellbore from the wellhead to the target fracturing segment, measured in m; s denotes a wellbore friction coefficient; ρ denotes a fracturing fluid density, measured in kilograms per cubic meter (kg/m³); $v_p$ denotes a fracturing fluid flow rate in the wellbore, measured in m/s; and D denotes an inner diameter of the wellbore, measured in m.

4. The method of claim 1, wherein a calculation formula in the operation S4 is expressed as:

$$p_s = p_o - p_f + p_g$$

where $p_s$ denotes the wellbore pressure at the target fracturing segment, measured in Pa; $p_o$ denotes the wellhead pressure, measured in Pa; $p_f$ denotes the wellbore friction resistance along the way from the wellhead to the target fracturing segment, measured in Pa; and $p_g$ denotes a wellbore hydrostatic fluid column pressure from the wellhead to the target fracturing segment, measured in Pa.

5. The method of claim 1, wherein a calculation formula in the operation S7 is expressed as:

$$f_i = \frac{12.5\rho}{\pi^2 m_i^2 d_i^4}$$

where $f_i$ denotes the perforation friction resistance coefficient of the i-th perforation cluster, measured in Pa·s²·m⁻⁶; $m_i$ denotes the count of effective perforation clusters of the i-th perforation cluster; $d_i$ denotes a perforation aperture of the i-th perforation cluster, measured in m; and ρ denotes a fracturing fluid density, measured in kilograms per cubic meter (kg/m³).

6. The method of claim 1, wherein the operation S9 further includes:

in response to determining that the cumulative fracturing time is less than the total hydraulic fracturing time, which indicates that the fracturing construction is not completed,
updating the fracturing fluid displacement of each perforation cluster and the cumulative fracturing time, and
repeating the operations S3-S9; and in response to determining that the cumulative fracturing time is greater than or equal to the total hydraulic fracturing time, which indicates that the fracturing construction is completed, proceeding to the operation S10.

7. The method of claim 1, wherein the operation S11 includes:

in response to determining that the variation coefficient V of the fracturing fluid displacement distribution is less than or equal to 0.2, determining that a difference in the fracturing fluid displacement of each perforation cluster is small, and the temporary plugging effect of fracturing is good;

in response to determining that the variation coefficient V of the fracturing fluid displacement distribution is greater than 0.2 and less than 0.4, determining that the difference in the fracturing fluid displacement of each perforation cluster is moderate, and the temporary plugging effect of fracturing is medium; and in response to determining that the variation coefficient V of the fracturing fluid displacement distribution is greater than 0.4, determining that the difference in the fracturing fluid displacement of each perforation cluster is large, and the temporary plugging effect of fracturing is poor, when the temporary plugging effect of fracturing is poor, reducing the pumping rate in a first operation parameter, and improving uniformity of the particle size distribution of the temporary plugging balls so as to determine a second operation parameter . . . to adjust the flow direction of the fracturing fluid and avoid uneven development of the cracks caused by poor operation effect.

8. The method of claim 1, wherein the control system further includes a second timer, the second timer is configured to obtain an operation duration of the temporary plugging operation, and the method further comprises:

determining the operation instruction based on the temporary plugging operation time and the cumulative fracturing time;

in response to determining that the cumulative fracturing time is not less than the temporary plugging operation time, indicating that the temporary plugging balls are put in to perform the temporary plugging operation, determining the operation instruction to be null;

in response to determining that the cumulative fracturing time is less than the temporary plugging operation time, indicating that the temporary plugging operation is not carried out at this time, determining the operation instruction to be non-null.

9. The method of claim 1, further comprises:

in response to determining that a hydraulic pressure variation coefficient is greater than a preset threshold, determining the operation instruction to start the temporary plugging operation.

* * * * *